United States Patent
Chen et al.

(10) Patent No.: US 8,080,955 B2
(45) Date of Patent: Dec. 20, 2011

(54) DRIVING METHOD AND RELATED DRIVING DEVICE FOR A MOTOR

(75) Inventors: Kun-Min Chen, Changhua County (TW); Ming-Jung Tsai, Chang-Hua (TW); Sung-Ming Lai, Hsinchu (TW); Ching-Sheng Li, Hsinchu County (TW); Ching-Shan Lu, Kaohsiung County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 418 days.

(21) Appl. No.: 12/476,236

(22) Filed: Jun. 1, 2009

(65) Prior Publication Data

US 2010/0253259 A1    Oct. 7, 2010

(30) Foreign Application Priority Data

Apr. 3, 2009 (TW) ................ 98111269 A (51) Int. Cl.
*H02P 23/14* (2006.01)
(52) U.S. Cl. ........... 318/400.14; 318/400.2; 318/400.41; 318/432; 73/862.331; 180/446
(58) Field of Classification Search ............ 318/400.02, 318/400.14, 400.41, 602, 701, 400.2, 432; 324/165; 180/446; 73/331, 862, 862.331
See application file for complete search history.

(56) References Cited

U.S. PATENT DOCUMENTS

| | | | | |
|---|---|---|---|---|
| 3,834,345 | A * | 9/1974 | Hager et al. | 440/1 |
| 3,894,250 | A * | 7/1975 | Hager et al. | 327/511 |
| 4,211,963 | A * | 7/1980 | Muller | 318/400.41 |
| 4,687,976 | A * | 8/1987 | Shimizu | 318/432 |
| 4,737,674 | A * | 4/1988 | Miyao | 310/268 |
| 5,600,559 | A * | 2/1997 | Nishimoto et al. | 701/41 |
| 5,720,361 | A * | 2/1998 | Nishimoto et al. | 180/446 |
| 5,834,918 | A * | 11/1998 | Taylor et al. | 318/601 |
| 5,881,836 | A * | 3/1999 | Nishimoto et al. | 180/446 |
| 5,984,042 | A * | 11/1999 | Nishimoto et al. | 180/446 |
| 5,999,869 | A * | 12/1999 | Nishimoto et al. | 701/41 |
| 6,005,320 | A * | 12/1999 | Kim et al. | 310/156.36 |
| 6,129,172 | A * | 10/2000 | Yoshida et al. | 180/446 |
| 6,498,474 | B1 * | 12/2002 | Turner | 324/165 |
| 6,868,743 | B2 * | 3/2005 | Nakane et al. | 73/862.331 |
| 7,191,669 | B2 * | 3/2007 | Nakane et al. | 73/862.331 |
| 7,800,325 | B2 * | 9/2010 | Song et al. | 318/400.02 |
| 2003/0001563 | A1 * | 1/2003 | Turner | 324/165 |
| 2004/0066165 | A1 * | 4/2004 | Kamio et al. | 318/701 |
| 2004/0093961 | A1 * | 5/2004 | Nakane et al. | 73/862.331 |
| 2005/0126309 | A1 * | 6/2005 | Nakane et al. | 73/862.331 |
| 2008/0272765 | A1 * | 11/2008 | Song et al. | 324/173 |

* cited by examiner

*Primary Examiner* — Paul Ip
(74) *Attorney, Agent, or Firm* — Winston Hsu; Scott Margo (57) ABSTRACT

A driving method for a motor includes sensing variation of magnetic pole of a rotator of the motor, to generate a magnetic pole sensing signal, determining dead zone of the motor according to the magnetic pole sensing signal, to generate a determination result, and adjusting voltage outputted to a coil of the rotator according to the determination result.

18 Claims, 7 Drawing Sheets

DRIVING METHOD AND RELATED DRIVING DEVICE FOR A MOTOR

BACKGROUND OF THE INVENTION

1. Field of the Invention

The present invention is related to a driving method and related driving device for a motor, and more particularly, to a driving method and related driving device capable of reducing production cost and preventing interference, so as to optimize operating efficiency of the motor.

2. Description of the Prior Art

Computer systems have become the most important appliances in the modern information society. With the advancement of computing rate, various circuits in a computer system, e.g. a Central Processing Unit (CPU), generate more heat under high speed operation. To dissipate the heat, the computer system can stably operate. Therefore, several heat dissipation fans are included in the computer system to lower temperatures of CPU, a graphic card, etc. Driven by a motor, a heat dissipation fan is utilized for creating airflow, so as to dissipate heat. In general, altering directions and intensity of current in a coil of a rotator of the motor, the motor can generate magnetic force with different strength and magnetic poles, to interact with permanent magnets on stators of the motor, so as to rotate the motor.

In addition to wind shear noises generated by rotation of the heat dissipation fan, high-frequency noises generated by the motor annoy users as well. Therefore, in order to decrease the noises of the motor, the prior art has developed various control methods and related control circuits to smoothly change rotating speed of the motor. Please refer to FIG. 1, which is a schematic diagram of a driving circuit 10 for a motor in the prior art. The driving circuit 10 is utilized for controlling current intensity of a coil 12 of the motor, and includes a Hall sensor 100, a pre-amplifier circuit 102, a second-stage amplifier circuit 104 and a gain determination unit 106. The Hall sensor 100 senses a magnetic pole of the rotator, transforms corresponding sensing results into differential magnetic pole sensing signals $H_+$, $H_-$ in voltage form, and transmits the differential magnetic pole sensing signals $H_+$, $H_-$ to the pre-amplifier circuit 102, such that the pre-amplifier circuit 102 can preliminarily amplify the differential magnetic pole sensing signals $H_+$, $H_-$ and transmit corresponding amplifying results to the second-stage amplifier circuit 104. The second-stage amplifier circuit 104 is utilized for amplifying output signals of the pre-amplifier circuit 102 according to signals outputted from the gain determination unit 106, to output voltages OUT1, OUT2 to the coil 12, so as to drive the motor.

Figure 1:
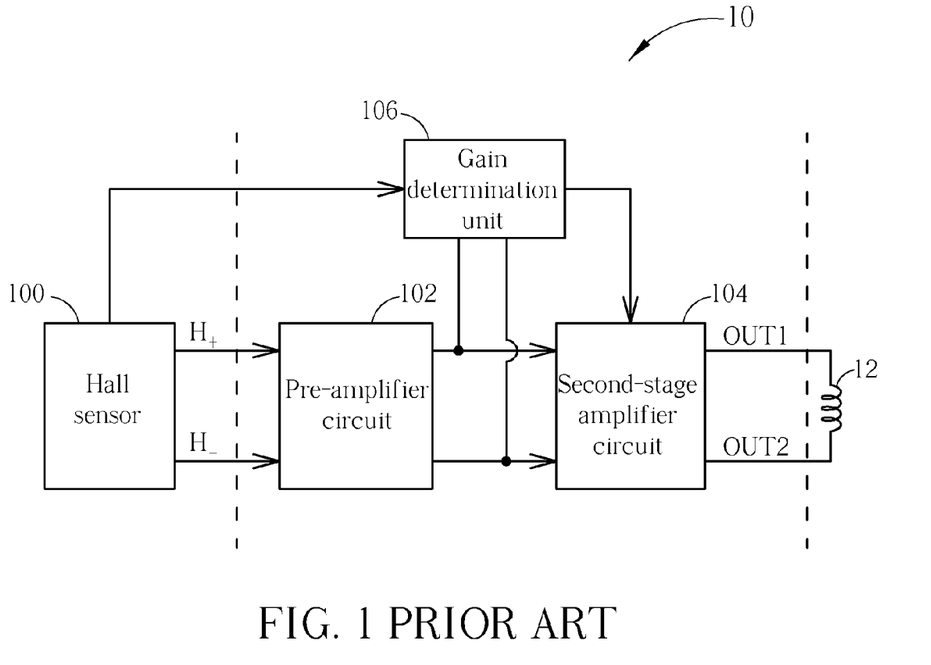
FIG. 1 is a schematic diagram of a driving circuit for a motor in the prior art.
Figure 2:
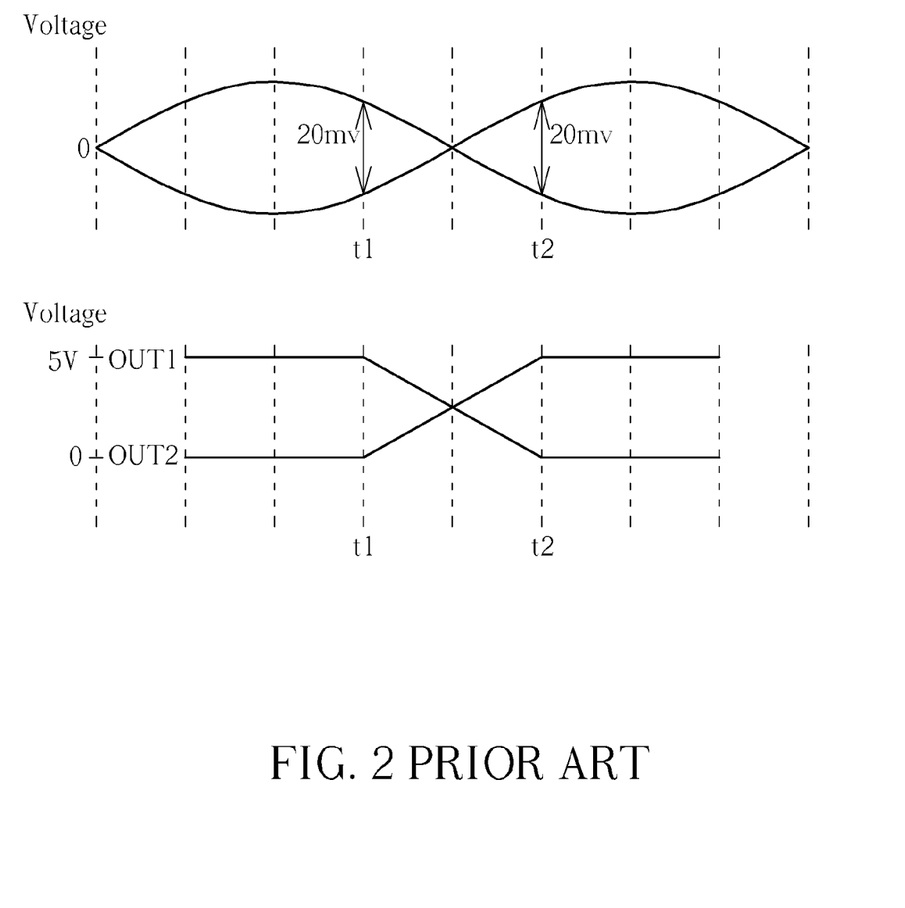
FIG. 2 is a time-variant schematic diagram of related signals of FIG. 1.

In detail, please continue to refer to FIG. 2, which is a time-variant schematic diagram of the differential magnetic pole sensing signals $H_+$, $H_-$ and the voltages OUT1, OUT2 of FIG. 1. As illustrated in FIG. 2, with operations of the gain determination unit 106, when a voltage difference between the differential magnetic pole sensing signals $H_+$ and $H_-$ is greater than 20 mv, the second-stage amplifier circuit 104 outputs the saturated voltages OUT1, OUT2, i.e. 5 V. When the difference between the differential magnetic pole sensing signals $H_+$ and $H_-$ is smaller than 20 mv, the voltages OUT1, OUT2 outputted by the second-stage amplifier circuit 104 is proportional to the differential magnetic pole sensing signals $H_+$, $H_-$ by a multiplier G. That is:

$$OUT1 = G \times (H_+ - H_-)$$

$$OUT2 = G \times (H_- - H_+)$$

where the multiplier G is a product of gains of the pre-amplifier circuit 102 and the second-stage amplifier circuit 104, and G=250 in this example.

Therefore, the voltages OUT1, OUT2 are gently changed, so is a slope related to the current of the coil 12 when the motor commutes, i.e. the time interval between t1 and t2 in FIG. 2. As a result, the noises of the motor can be decreased. Such method can effectively decrease the noises of the motor; however, it is troublesome in implementation. For example, in FIG. 2, when the differential magnetic pole sensing signals $H_+$, $H_-$ approach a zero-crossing point, the Hall sensor 100 senses weaker magnetic intensity. Therefore, in practical circuits, sensitivity must be accordingly upgraded to prevent external or internal interference from affecting waveforms of the voltages OUT1, OUT2. In such a situation, when the driving circuit 10 is realized by a single chip, the Hall sensor 100 must be implemented through external connection and different manufacturing processes, to upgrade the sensitivity. As a result, manufacturing cost thereof accordingly increases.

SUMMARY OF THE INVENTION

It is therefore a primary objective of the claimed invention to provide a driving method and related driving device for a motor, to overcome disadvantages of the prior art.

The present invention discloses a driving method for a motor, which comprises sensing variation of a magnetic pole of a rotator of the motor to generate a magnetic pole sensing signal, determining a dead zone of the motor according to the magnetic pole sensing signal to generate a determination result, and adjusting voltage outputted to a coil of the rotator according to the determination result.

The present invention further discloses a driving device for a motor, which comprises a magnetic pole sensor for sensing variation of a magnetic pole of a rotator of the motor to generate a magnetic pole sensing signal, a determination unit for determining a dead zone of the motor according to the magnetic pole sensing signal to generate a determination result, and a driving unit for adjusting voltage outputted to a coil of the rotator according to the determination result of the determination unit.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
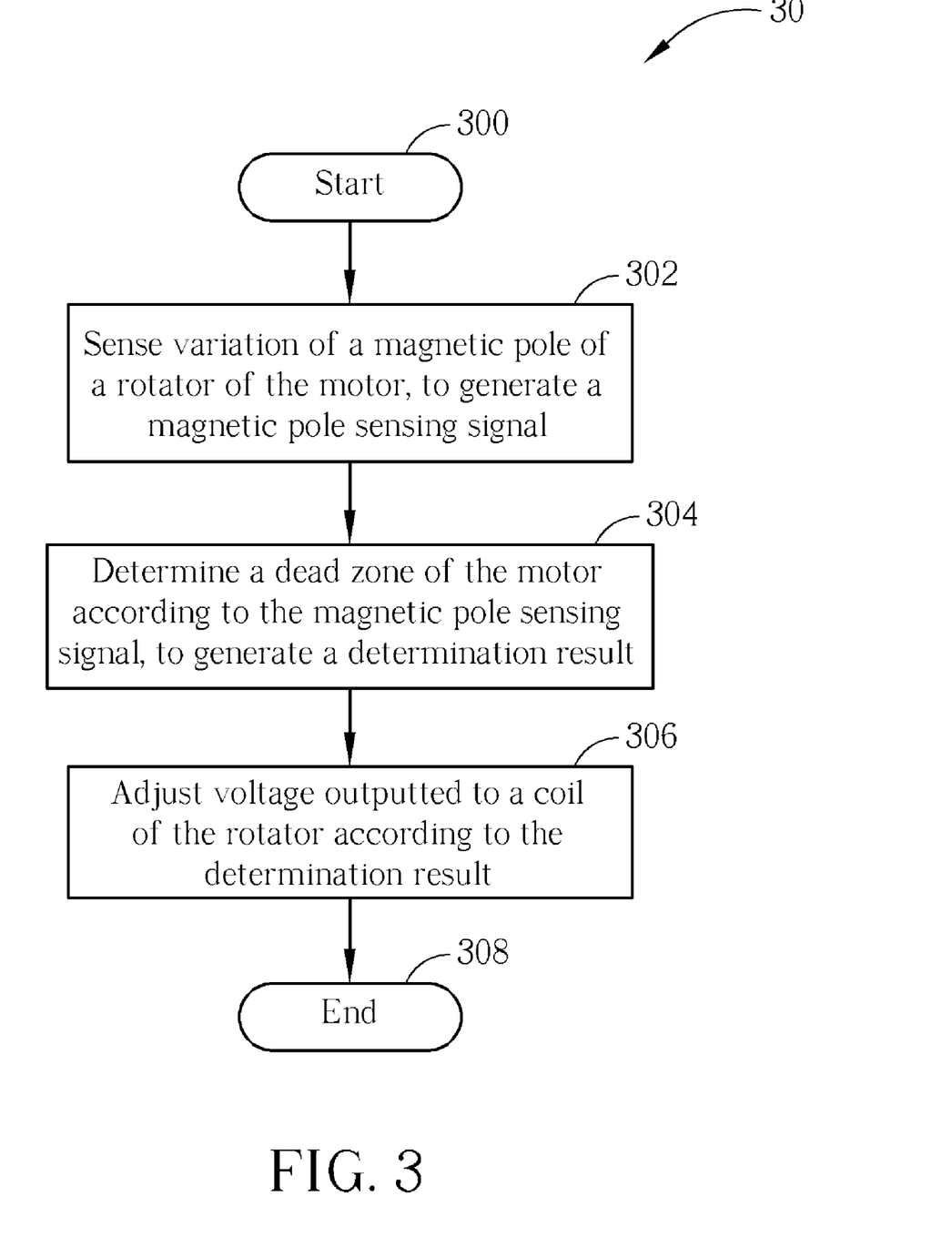
FIG. 3 is a schematic diagram of a driving process for a motor according to an embodiment of the present invention.

Please refer to FIG. 3, which is a schematic diagram of a driving process 30 for a motor according to an embodiment of the present invention. The driving process 30 includes the following steps:

Step 300: Start.

Step 302: Sense variation of a magnetic pole of a rotator of the motor, to generate a magnetic pole sensing signal.

Step 304: Determine a dead zone of the motor according to the magnetic pole sensing signal, to generate a determination result.

Step 306: Adjust voltage outputted to a coil of the rotator according to the determination result.

Step 308: End.

According to the driving process 30, the present invention determines the dead zone of the motor in accordance with the magnetic pole sensing signal, and accordingly adjusts the voltage outputted to the coil. Since the voltage outputted to the coil has to be linearly varied and be a fixed multiple of the difference between the differential magnetic pole sensing signals when the motor is in the dead zone, the present invention can adjust the voltage outputted to the coil with linear variation according to a starting time instance of the dead zone. In other words, instead of directly amplifying the differential magnetic pole sensing signals, the present invention determines the dead zone of the motor first, and accordingly determines the voltage outputted to the coil, such that the voltage outputted to the coil is linearly varied when the motor is in the dead zone, and is fixed when the motor is out of the dead zone. As a result, for hardware implementation, the present invention is not restricted by sensitivity requirement, and can lower manufacturing cost.

Figure 4:
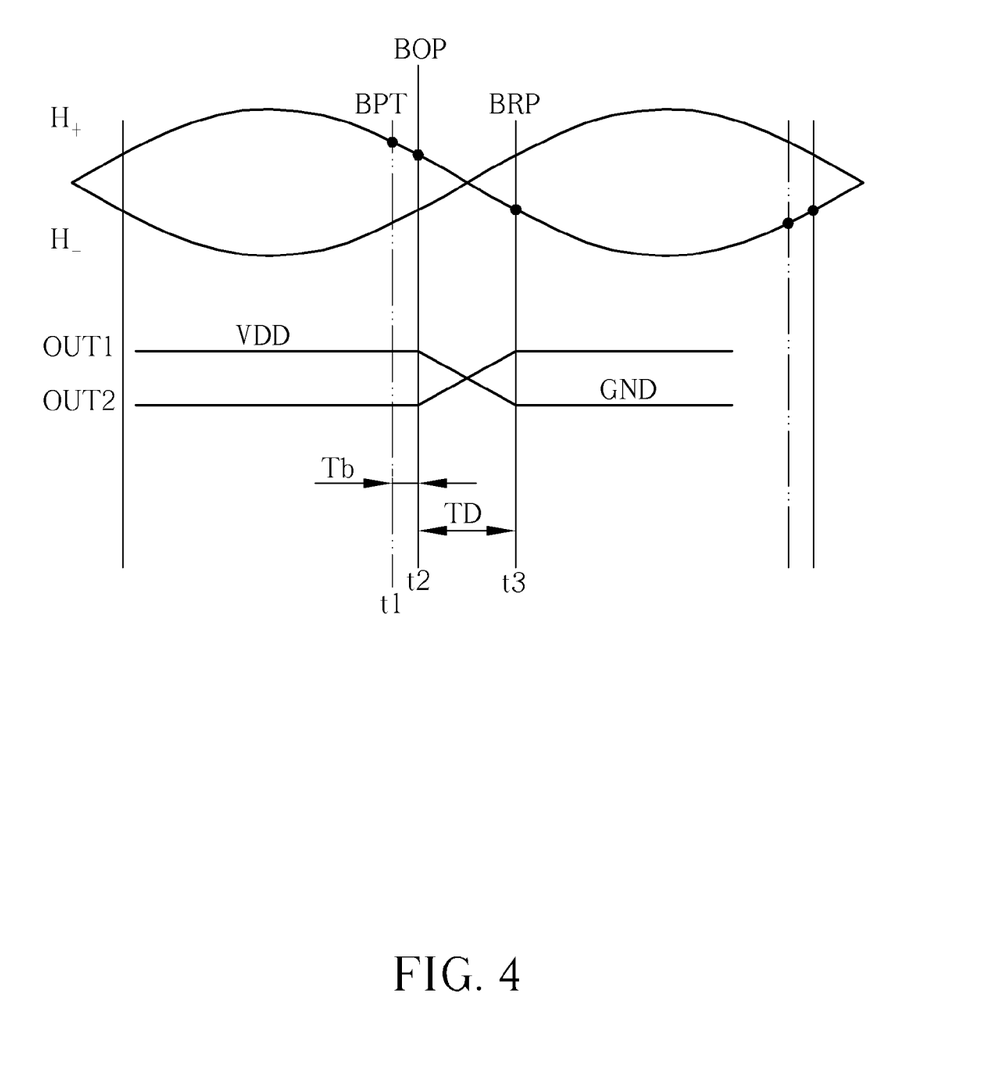
FIG. 4 is a time-variant schematic diagram of related signals corresponding to an embodiment of the driving process of FIG. 3.

In Step 304, preferably, the present invention can determine the dead zone of the motor according to a time-variant slope of the magnetic pole sensing signal before the motor activates commutation. That is, before the motor activates commutation, the present invention first computes the time-variant slope of the magnetic pole sensing signal, and accordingly estimates the dead zone. For example, please refer to FIG. 4, which is a time-variant schematic diagram of related signals corresponding to an embodiment of the driving process 30. In FIG. 4, the present invention sets up default values BPT, BOP, BRP of the magnetic pole sensing signal $H_+$, where the default value BPT is corresponding to a magnetic field intensity before the motor activates commutation, the default value BOP is corresponding to a magnetic field intensity when the motor activates commutation, and the default value BRP is corresponding to a magnetic field intensity when the motor completes commutation. Next, the present invention counts a time interval Tb between the magnetic pole sensing signal $H_+$ equal to the default value BPT and the magnetic pole sensing signal $H_+$ equal to the default value BOP, i.e. Tb=t2−t1. After acquiring the time interval Tb, the present invention can compute a time-variant slope m of the magnetic pole sensing signal, i.e. m=Tb÷(BPT−BOP). Finally, according to the slope m, the present invention can compute a dead zone TD between the magnetic pole sensing signal $H_+$ equal to the default value BOP and the magnetic pole sensing signal $H_+$ equal to the default value BRP, i.e. TD=m×(BOP−BRP).

In FIG. 4, between time instances t1 and t3, the magnetic pole sensing signal $H_+$ approaches a straight line, i.e. the slope of the magnetic pole sensing signal $H_+$ is almost a fixed value. In such a situation, once the slope of the magnetic pole sensing signal $H_+$ between the time instances t1 and t2 is acquired, the dead zone TD can be accordingly estimated. In other words, the present invention estimates the dead zone TD in which the magnetic pole sensing signal $H_+$ varies from the default value BOP to the default value BRP according to the time-variant slope (from t1 to t2) of the magnetic pole sensing signal $H_+$ before the motor activates commutation. As a result, as illustrated by FIG. 4, the present invention outputs linearly varied voltages OUT1, OUT2 in the dead zone TD, and outputs stable voltages OUT1, OUT2, such as a system voltage VDD or a ground voltage GND, out of the dead zone TD. For example, assume that the magnetic intensities corresponding to the default values BPT, BOP, BRP are 40, 30 and −30 Gauss respectively, the system voltage VDD is 5 V, and the ground voltage GND is 0 V. If Tb=t2−t1=50 us, the magnetic intensity takes 50 us to vary from 40 Gauss of BPT to 30 Gauss of BOP. Therefore, with a margin of 30−(−30)=60 from 30 Gauss of BOT to −30 Gauss of BRP, the magnetic intensity takes (50 us)×(60 Gauss/10 Gauss)=300 us to vary from BOT to BRP. In such a situation, the dead zone TD is 300 us, and a slope of the output voltage OUT1 is 300 us/(GND−VDD), i.e. (−300 us/5 V). Therefore, the output voltage OUT1 varies with the slope (−300 us/5 V) in the dead zone TD, and is fixed at 5 V or 0 V out of the dead zone TD.

Note that, the embodiment of FIG. 4 is utilized for illustrating how to compute the slope of the magnetic pole sensing signal $H_+$ before the motor activates commutation according to the variation of the magnetic pole sensing signal $H_+$, to estimate the dead zone TD, so as to adjust the voltage OUT1. Certainly, such concept can further be applied to the magnetic pole sensing signal $H_-$ and the output voltage OUT2 or for other time instances, and is not limited to the embodiment of FIG. 4. Meanwhile, those skilled in the art can include steps for determining magnetic pole of the magnetic pole sensing signal, which are not key points of the present invention, and not given herein.

In short, the present invention is to determine the time-variant slope of the magnetic pole sensing signal before the motor activates commutation according to the variation of the magnetic pole sensing signal and accordingly determine the dead zone, so as to properly adjust the voltage outputted to the coil. Using such concept, those skilled in the art can make modification and variation accordingly. For example, in FIG. 4, the default values BPT, BOP, BRP differ with the motor, where the default value BPT should approach the default value BOP as possible, to ensure that the slope of the magnetic pole sensing signal between the time instances t1 and t2 is almost equal to the slope between the time instances t2 and t3 (or t1 and t3), so as to enhance accuracy of the determination result.

In the prior art, the output voltages OUT1, OUT2 differ with the difference of the differential magnetic pole sensing signals. That is, the prior art has to upgrade sensitivity, to prevent external or motor interferences from affecting waveforms of the voltages OUT1, OUT2. In comparison, the present invention determines the slope of the output voltages by estimating the dead zone TD. In such a situation, a magnetic field sensed by the present invention has greater intensity, and thereby the highly sensitive Hall sensor is no longer needed. In other words, the present invention can use an embedded Hall sensor, to tremendously reduce manufacturing cost.

Figure 5A:
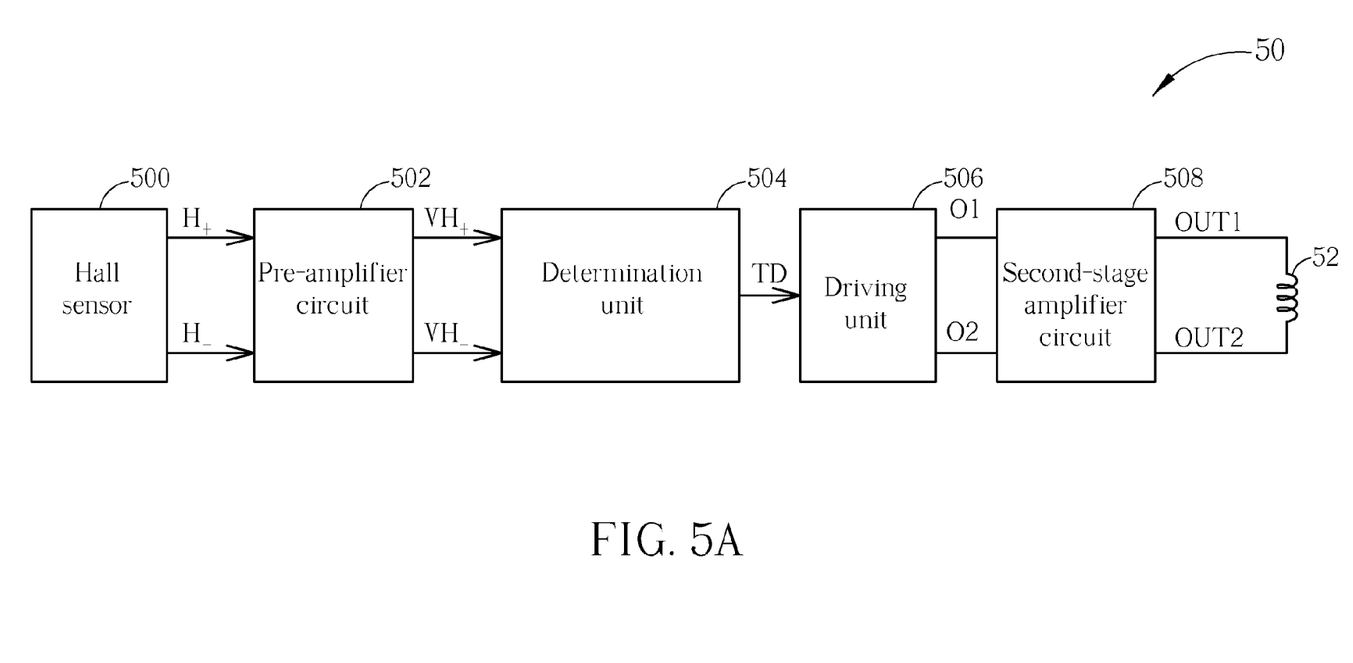
FIG. 5A is a schematic diagram of a driving device according to an embodiment of the present invention.

With respect to implementation of the present invention, please refer to FIG. 5A, which is a schematic diagram of a driving device 50 according to an embodiment of the present invention The driving device 50 includes a Hall sensor 500, a pre-amplifier circuit 502, a determination unit 504, a driving unit 506 and a second-stage amplifier circuit 508. The Hall sensor 500 is a magnetic pole sensor, and is utilized for sensing variation of magnetic pole of the rotator of the motor, to generate differential magnetic pole sensing signals $H_+$, $H_-$ in voltage form. The pre-amplifier circuit 502 is utilized for amplifying the differential magnetic pole sensing signals $H_+$, $H_-$ and generating corresponding differential magnetic pole sensing signals $VH_+$, $VH_-$ to the determination unit 504. The determination unit 504 is utilized for determining the dead zone TD of the motor according to the differential magnetic pole sensing signals $VH_+$, $VH_-$. The driving unit 506 is utilized for adjusting voltages O1, O2 outputted to the coil 52 according to the dead zone TD. Finally, the second-stage amplifier circuit 508 is utilized for properly amplifying the voltages O1, O2 for the coil 52, to drive the motor.

Figure 5B:
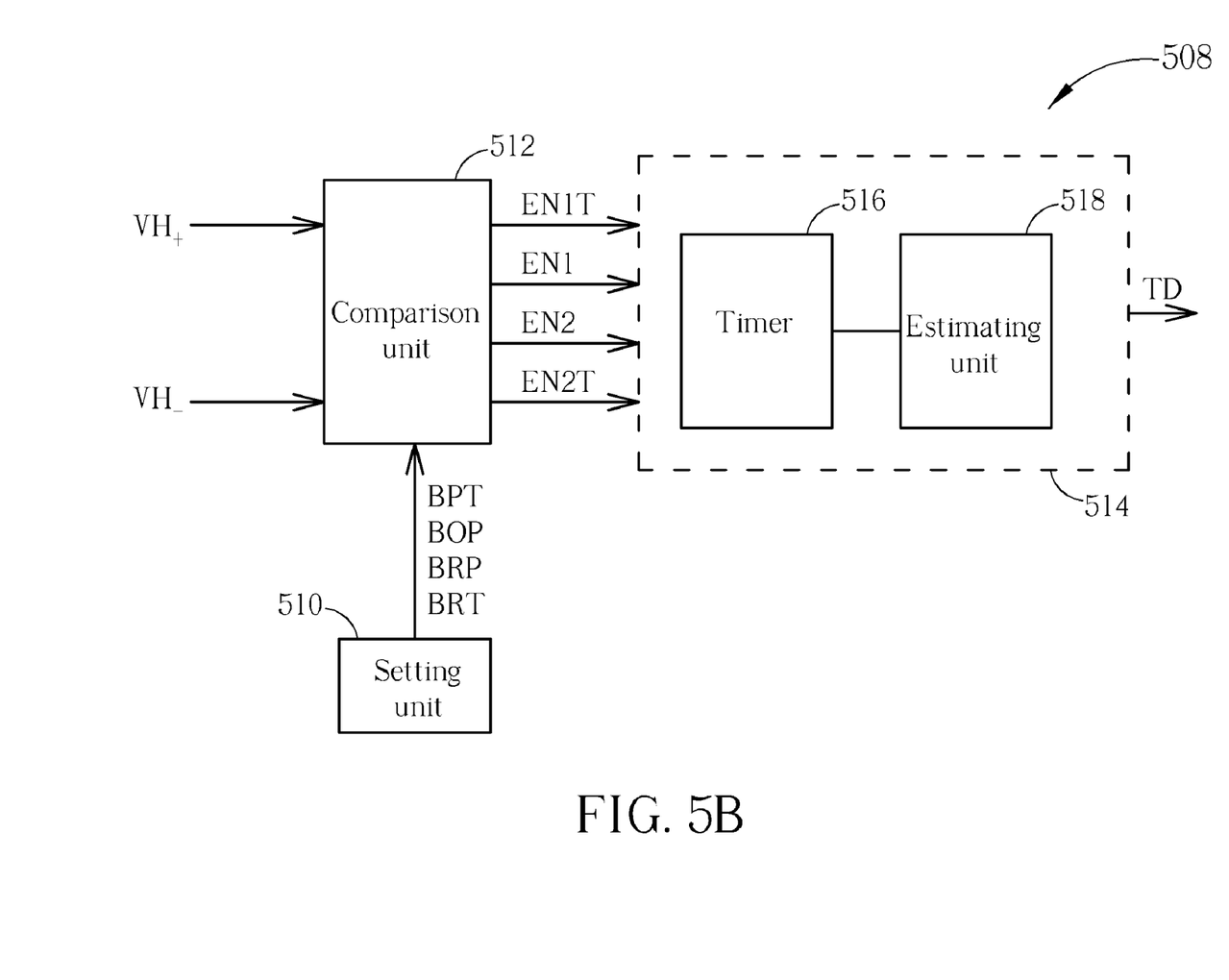
FIG. 5B is a schematic diagram of a determination unit of FIG. 5A.

Please continue to refer to FIG. 5B, which is a schematic diagram of the determination unit 504 shown in FIG. 5A. The determination unit 504 comprises a setting unit 510, a comparison unit 512 and a prediction unit 514. The setting unit 510 is utilized for setting default values BPT, BOP, BRP, BRT of the differential magnetic pole sensing signals $VH_+$, $VH_-$, which are respectively corresponding to magnetic field intensities before commutation, when starting commutation, when completing commutation and after commutation. The comparison unit 512 is utilized for comparing the differential magnetic pole sensing signals $VH_+$, $VH_-$ with the default values BPT, BOP, BRP, BRT, to respectively generate comparison results EN1T, EN1, EN2, EN2T. The prediction unit 514 is composed of a timer 516 and an estimating unit 518, and is utilized for estimating the dead zone TD according to the comparison results EN1T, EN1, EN2, EN2T and the default values BPT, BOP, BRP, BRT.

Figure 6:
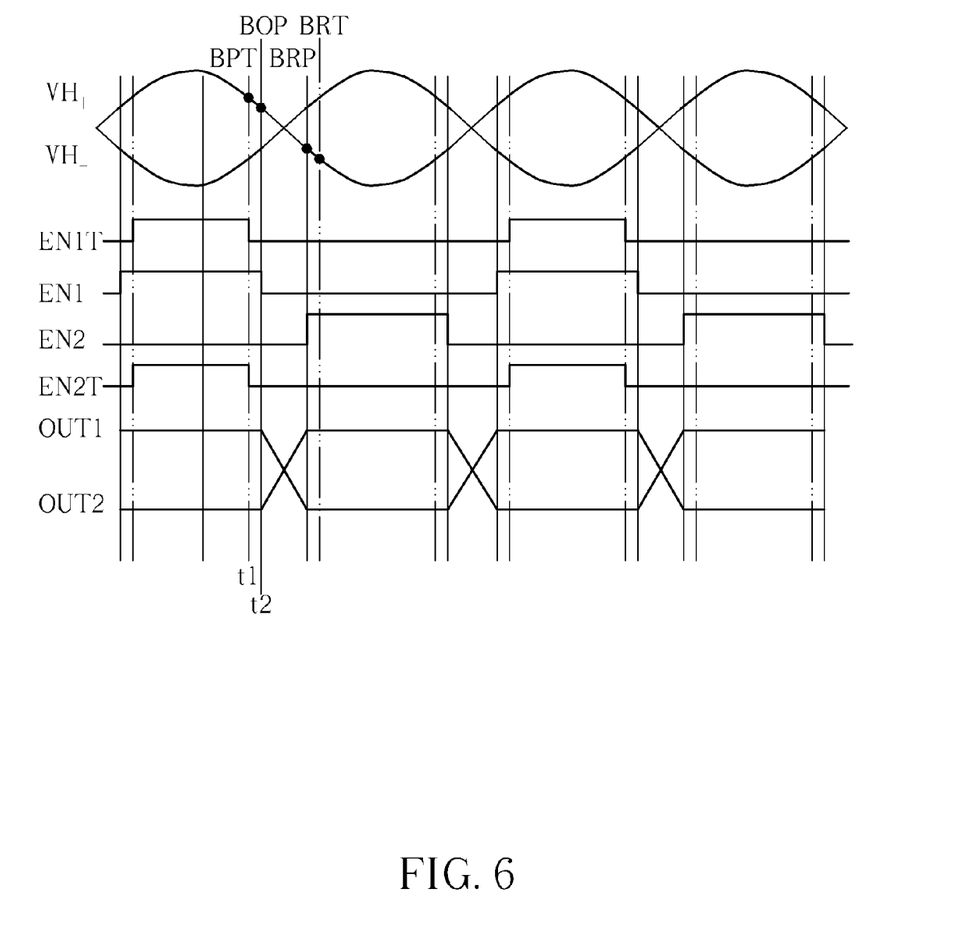
FIG. 6 is a time-variant schematic diagram of signals related to the driving device of FIG. 5A.

In order to clearly explain how the determination unit 504 works, please continue to refer to FIG. 6, which is a time-variant schematic diagram of signals related to the driving device 50. First, after the pre-amplifier circuit 502 outputs the differential magnetic pole sensing signals $VH_+$, $VH_-$ to the determination unit 504, the comparison unit 512 compares the differential magnetic pole sensing signals $VH_+$, $VH_-$ with the default values BPT, BOP, BRP, BRT, to generate the comparison results EN1T, EN1, EN2, EN2T by logic listed below:

1. When the differential magnetic pole sensing signal $VH_+$ is equal to the default value BPT, the comparison result EN1T varies from HIGH to LOW.
2. When the differential magnetic pole sensing signal $VH_+$ is equal to the default value BOT, the comparison result EN1 varies from HIGH to LOW.
3. When the differential magnetic pole sensing signal $VH_+$ is equal to the default value BRP, the comparison result EN2 varies from HIGH to LOW.
4. When the differential magnetic pole sensing signal $VH_+$ is equal to the default value BRT, the comparison result EN2T varies from HIGH to LOW.

Therefore, according to the comparison results EN1T, EN1, EN2, EN2T, the prediction unit 514 can determine the variation of the magnetic pole sensing signal $VH_+$, and accordingly estimate the dead zone TD. For example, at the time instance t1, a variation from HIGH to LOW in the comparison result EN1T means that the magnetic pole sensing signal $VH_+$ is equal to the default value BPT, and then the timer 516 can start counting. At the time instance t2, a variation from HIGH to LOW in the comparison result EN1 means that the magnetic pole sensing signal $VH_+$ is equal to the default value BOP, and then the timer 516 can accordingly stop counting. Next, the estimating unit 518 can compute the time-variant slope m of the magnetic pole sensing signal $VH_+$ according to the time interval Tb between the time instances t1 and t2. After that, according to the slope m, the estimating unit 518 can compute the dead zone TD of the magnetic pole sensing signal $VH_+$, i.e. TD=m×(BOP−BRP). When the dead zone TD is acquired, the determination unit 504 transmits information of the dead zone TD to the driving unit 506, to determine the time-variant slope of the output voltages OUT1, OUT2 as (+/−)TD/(GND−VDD), such that magnitudes of the output voltages OUT1, OUT2 would increase or decrease gradually. As a result, the time-variant slope of currents of the motor can vary slowly, so as to reduce noises.

Therefore, in the driving device 50, the determination unit 504 determines the time-variant slopes of the differential magnetic pole sensing signals $VH_+$, $VH_-$ before the motor activates commutation according to the variation of the differential magnetic pole sensing signals $VH_+$, $VH_-$, and thereby determines the dead zone TD of the motor, so as to determine the slopes of the output voltages OUT1, OUT2 in the dead zone TD by the driving unit 506. Note that, the main concept of the present invention is determining the time-variant slope of the magnetic pole sensing signal before the motor activates commutation according to the variation of the magnetic pole sensing signal and thereby determining the dead zone TD of the motor, so as to properly adjust the voltage outputted to the coil. Using the concept, those skilled in the art can make modification and variation accordingly. For example, the driving unit 506 can be a digital or analog linear voltage generator. In addition, in FIG. 6, the comparison results EN1T, EN1, EN2, EN2T can be modified to form other embodiments only if the magnetic pole sensing signal $VH_+$ can be accordingly determined, and are not limited to the waveforms shown in FIG. 6.

The prior art directly amplifies the difference of the differential magnetic pole sensing signals, and the magnetic field intensity sensed by the Hall sensor is weaker when the differential magnetic pole sensing signal approaches the zero-crossing point and thereby easily interfered by the environment. Therefore, the prior art has to upgrade sensitivity. In comparison, the driving device 50 of the present invention estimates the dead zone TD according to the magnetic pole sensing signal before commutation. In other words, the magnetic field intensity sensed by the present invention is stronger and far from the zero-crossing point, and thereby is sufficient to be sensed by the Hall sensor 500 with poorer sensitivity. Moreover, the present invention has lower requirement on the pre-amplifier circuit 502 and a smaller circuit layout area is practicable. Meanwhile, if the driving device 50 is realized by a single chip, the present invention can use an embedded Hall sensor 500 to reduce manufacturing cost, and adopt a manufacturing process the same as those of other components to reduce process variation, such that rotation of the motor is immune from external factors, such as temperature, so as to optimize efficiency of the motor.

To sum up, the present invention determines the time-variant slope of the magnetic pole sensing signal before the motor activates commutation according to the variation of the magnetic pole sensing signal, and accordingly determines the dead zone of the motor, to properly adjust the voltage outputted to the coil. Therefore, the present invention can utilize and embed the Hall sensor with poorer sensitivity in a chip, to reduce manufacturing cost and prevent external interference, so as to enhance the efficiency.

Those skilled in the art will readily observe that numerous modifications and alterations of the device and method may be made while retaining the teachings of the invention.

What is claimed is:
1. A driving method for a motor comprising:
   sensing variation of a magnetic pole of a rotator of the motor, to generate a magnetic pole sensing signal;

determining a dead zone of the motor according to a time-variant slope the magnetic pole sensing signal before the motor activates commutation, to generate a determination result, comprising setting a first default value, a second default value and a third default value of the magnetic pole sensing signal, wherein the first default value is corresponding to a magnetic field intensity before the motor activates commutation, the second default value is corresponding to a magnetic field intensity when the motor activates commutation, and the third default value is corresponding to a magnetic field intensity when the motor completes commutation;

comparing the magnetic pole sensing signal with the first default value and the second default value, to generate a comparison result;

counting a time interval between the magnetic pole sensing signal equal to the first default value and the magnetic pole sensing signal equal to the second default value, to generate a counting result; and computing the time-variant slope of the magnetic pole sensing signal before the motor activates commutation according to the counting result, the first default value and the second default value, to determine a time interval between the magnetic pole sensing signal equal to the second default value and the magnetic pole sensing signal equal to the third default value, so as to determine the dead zone of the motor and generate the determination result; and adjusting voltage outputted to a coil of the rotator according to the determination result.

2. The driving method of claim 1, wherein computing the time-variant slope of the magnetic pole sensing signal before the motor activates commutation according to the counting result, the first default value and the second default value is dividing the counting result by a difference between the first default value and the second default value, to compute the time-variant slope.

3. The driving method of claim 1, wherein determining the time interval between the magnetic pole sensing signal equal to the second default value and the magnetic pole sensing signal equal to the third default value is multiplying the time-variant slope by the difference between the second default value and the third default value, to estimate the time interval between the magnetic pole sensing signal equal to the second default value and the magnetic pole sensing signal equal to the third default value.

4. The driving method of claim 1, wherein adjusting the voltage outputted to the coil of the rotator according to the determination result is outputting a linear voltage to the coil of the rotator when the motor is in the dead zone and outputting a fixed voltage to the coil of the rotator when the motor is out of the dead zone according to the determination result.

5. The driving method of claim 4, wherein the linear-variant voltage is linearly reduced from a system voltage to a ground voltage.

6. The driving method of claim 4, wherein the linear-variant voltage is linearly increased from a ground voltage to a system voltage.

7. The driving method of claim 4, wherein the fixed voltage is a system voltage or a ground voltage.

8. A driving device for a motor comprising:

a magnetic pole sensor, for sensing variation of a magnetic pole of a rotator of the motor, to generate a magnetic pole sensing signal;

a determination unit, for determining a dead zone of the motor according to a time-variant slope the magnetic pole sensing signal before the motor activates commutation, to generate a determination result, the determination unit comprising:

a setting unit, for setting a first default value, a second default value and a third default value of the magnetic pole sensing signal, wherein the first default value is corresponding to a magnetic field intensity before the motor activates commutation, the second default value is corresponding to a magnetic field intensity when the motor activates commutation, and the third default value is corresponding to a magnetic field intensity when the motor completes commutation;

a comparison unit, for comparing the magnetic pole sensing signal with the first default value and the second default value, to generate a comparison result;

a timer, for counting a time interval between the magnetic pole sensing signal equal to the first default value and the magnetic pole sensing signal equal to the second default value, to generate a counting result; and an estimating unit, for computing the time-variant slope of the magnetic pole sensing signal before the motor activates commutation according to the counting result, the first default value and the second default value, to determine a time interval between the magnetic pole sensing signal equal to the second default value and the magnetic pole sensing signal equal to the third default value, so as to determine the dead zone of the motor and generate the determination result; and a driving unit, for adjusting voltage outputted to a coil of the rotator according to the determination result of the determination unit.

9. The driving device of claim 8, wherein the magnetic pole sensor is a Hall Sensor.

10. The driving device of claim 8, wherein the estimating unit is utilized for dividing the counting result by a difference between the first default value and the second default value, to compute the time-variant slope.

11. The driving device of claim 8, wherein the estimating unit is utilized for multiplying the time-variant slope by the difference between the second default value and the third default value, to estimate the time interval between the magnetic pole sensing signal equal to the second default value and the magnetic pole sensing signal equal to the third default value.

12. The driving device of claim 8, wherein the driving unit is utilized for outputting a linear voltage to the coil of the rotator when the motor is in the dead zone and outputting a fixed voltage to the coil of the rotator when the motor is out of the dead zone according to the determination result of the determination unit.

13. The driving device of claim 12, wherein the linear-variant voltage is linearly reduced from a system voltage to a ground voltage.

14. The driving device of claim 12, wherein the linear-variant voltage is linearly increased from a ground voltage to a system voltage.

15. The driving device of claim 12, wherein the fixed voltage is a system voltage or a ground voltage.

16. The driving device of claim 8 further comprising a pre-amplifier circuit between the magnetic pole sensor and the determination unit, for amplifying the magnetic pole sensing signal.

17. The driving device of claim 8 further comprising a second-stage amplifier circuit between the determination unit and the coil, for amplifying voltage outputted from the driving unit.

18. The driving device of claim 8 implemented by a single chip.

* * * * *